United States Patent
Huang et al.

(10) Patent No.: US 7,570,329 B2
(45) Date of Patent: Aug. 4, 2009

(54) LCD PANEL AND ELECTRONIC DEVICE USING THE SAME

(75) Inventors: Chun-Ming Huang, Taichung County (TW); Wen-Chun Wang, Taichung (TW); Chin-Pei Hwang, Kaohsiung (TW); Chien-Chung Chen, Taichung (TW); Yi-Fan Chen, Tainan (TW); Chin-Chang Liu, Taichung County (TW); Hen-Ta Kang, Taichung (TW)

(73) Assignee: Wintek Corporation, Taichung (TW)

( * ) Notice: Subject to any disclaimer, the term of this patent is extended or adjusted under 35 U.S.C. 154(b) by 100 days.

(21) Appl. No.: 11/898,539

(22) Filed: Sep. 13, 2007

(65) Prior Publication Data

US 2008/0068538 A1 Mar. 20, 2008

Related U.S. Application Data

(60) Provisional application No. 60/844,373, filed on Sep. 14, 2006.

(30) Foreign Application Priority Data

Jun. 23, 2007 (TW) ............................... 96122816 A (51) Int. Cl.
*G02F 1/1335* (2006.01)

(52) U.S. Cl. ...................... 349/117; 349/106; 349/113; 349/114

(58) Field of Classification Search .......... 349/113–114, 349/117

See application file for complete search history.

(56) References Cited

U.S. PATENT DOCUMENTS 6,831,721 B2 * 12/2004 Maeda et al. ............... 349/117
2004/0105059 A1 * 6/2004 Ohyama et al. ............. 349/114

* cited by examiner

*Primary Examiner*—David Nelms
*Assistant Examiner*—Phu Vu
(74) *Attorney, Agent, or Firm*—Rabin & Berdo, PC (57) ABSTRACT

A LCD panel includes a plurality of pixel elements. Each pixel element includes a first substrate, a second substrate and an optical filter portion. The first substrate and the second substrate are parallel to each other, and a liquid crystal layer is sealed between the first substrate and the second substrate. The first substrate includes a reflective portion, and the second substrate includes a color filter layer. The color filter layer disposed between the first substrate and the second substrate has an opening opposite to the reflective portion. The optical filter portion is disposed in the opening of the color filter layer for providing color compensation in a reflection mode.

25 Claims, 12 Drawing Sheets

LCD PANEL AND ELECTRONIC DEVICE USING THE SAME

This application claims the benefit of U. S. provisional application Ser. No. 60/844,373, filed Sep. 14, 2006 and Taiwan application Serial No. 96122816, filed Jun. 23, 2007, the subject matter of which is incorporated herein by reference.

BACKGROUND OF THE INVENTION

1. Field of the Invention

The invention relates in general to a liquid crystal display panel and an electronic device using the same, and more particularly to a liquid crystal display panel with coloring or color compensation effects and an electronic device using the same.

2. Description of the Related Art

Conventionally, each pixel structure of a transflective liquid crystal display (LCD) panel has a reflective region. In the reflective region, a reflector is disposed on a substrate, and a color filter is disposed on another substrate. When the transflective LCD panel is in reflection mode, outer light passes through the color filter and is reflected by the reflector for displaying an image.

However, the color filter substrate of the LCD panel is often coated with color filter resin, which has low light transmission. In the reflection mode, light passes through the color filter substrate twice after reflected. As a result, light utilization efficiency is poor, and the display quality in the reflection mode is lowered. Furthermore, due to the limitations of the reflector material, the material for optical compensation and the design thereof, yellow-shift or blue-shift often occurs in the displayed image in the reflection mode. When the LCD panel is in the transmission mode, color shift also exists in the displayed image.

SUMMARY OF THE INVENTION

The invention is directed to a liquid crystal display (LCD) panel and an electronic device using the same. A color filter with an opening is disposed on a substrate of the LCD panel. An optical filter portion is disposed in the opening for providing coloring or color compensation in both the reflection mode and the transmission mode of the LCD panel and displaying color images accordingly. Because the optical filter portion has high light transmission, light utilization efficiency and reflectivity of the LCD panel are increased.

According to the present invention, a LCD panel including a plurality of pixel elements is provided. Each pixel element includes a first substrate, a second substrate and an optical filter portion. The first substrate and the second substrate are parallel to each other. A liquid crystal layer is disposed between the first substrate and the second substrate. A color filter layer is disposed between the first substrate and the second substrate and has an opening opposite to the reflective portion. The optical filter portion is disposed in the opening of the color filter layer for providing color compensation in the reflection mode of the LCD panel.

According to the present invention, an electronic device including a display panel and a light source module is provided. The light source module is disposed on one side of the display panel for providing the display panel with light. The LCD panel includes a plurality of pixel elements. Each pixel element includes a first substrate, a second substrate and an optical filter portion. The first substrate and the second substrate are parallel to each other. A liquid crystal layer is disposed between the first substrate and the second substrate. The first substrate includes a reflective portion, and the second substrate includes a color filter layer. The color filter layer is disposed between the first substrate and the second substrate and has an opening opposite to the reflective portion. The optical filter portion is disposed in the opening of the color filter layer for providing color compensation in the reflection mode of the LCD panel.

According to the present invention, another liquid crystal display (LCD) panel including a plurality of pixel elements is provided. Each pixel element includes a first substrate, a second substrate opposite to the first substrate, a liquid crystal layer, an optical filter portion, a first polarizer, a second polarizer and a quarter-wave plate. The liquid crystal layer is disposed between the first substrate and the second substrate. The optical filter portion is disposed on the second substrate. The optical filter portion includes a first metal layer, a second metal layer and a spacer layer. The spacer layer is disposed between the first metal layer and the second metal layer. The first polarizer is disposed on the side of the first substrate. The second polarizer is disposed on the side of the second substrate. The quarter-wave plate is disposed between the second polarizer and the second substrate.

The invention will become apparent from the following detailed description of the preferred but non-limiting embodiments. The following description is made with reference to the accompanying drawings.

DETAILED DESCRIPTION OF THE INVENTION

First Embodiment

Figure 1A:
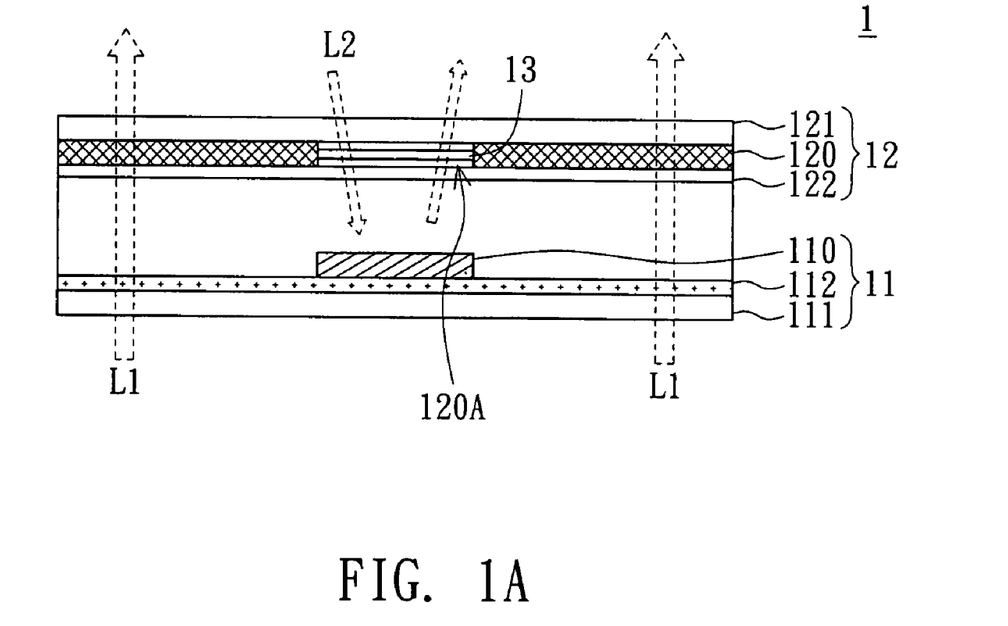
FIG. 1A is a first cross-sectional view of a liquid crystal display (LCD) panel according to a first embodiment of the present invention.

Please referring to FIG. 1A, a first cross-sectional view of a liquid crystal display (LCD) panel according to a first embodiment of the present invention is illustrated. The LCD panel includes a plurality of pixel elements. The pixel structure of one pixel element is illustrated in the present embodiment as an example. As shown in FIG. 1A, the pixel element of the LCD panel 1 includes a first substrate 11, a second substrate 12 and an optical filter portion 13. The first substrate 11 is substantially parallel to the second substrate 12, and a liquid crystal layer (not marked in the drawings) is disposed between the first substrate 11 and the second substrate 12. The first substrate 11 includes a reflective portion 110, and the second substrate 12 includes a color filter layer 120. The color filter layer 120 is disposed between the first substrate 11 and the second substrate 12 and has an opening 120A opposite to the reflective portion 110. The optical filter portion 13 is disposed in the opening 120A of the color filter layer 120 for providing color compensation. For example, after color compensated, the color displayed by the pixel element is at least one of the colors including white, red, green and blue. An accompany drawing is described later for further details.

A light source module (not shown in drawings) is often disposed on one side of the display panel 1. For example, the light source module is disposed under the first substrate 11. In a general mode, light L1 provided by the light source module passes through the first substrate 11 and the second substrate 12. Meanwhile, light L2 from the surroundings passes through the optical filter portion 13 of the second substrate 12 and then is reflected by the reflective portion 110. Furthermore, the light source module is turned off in the reflection mode. A reflective region formed in the reflective portion 110 of each pixel element by using the light L2 from the surroundings is mainly used for displaying an image in the reflection mode.

As shown in FIG. 1A, the first substrate 11 includes a first base plate 111 and a pixel electrode 112. The reflective portion 110 is disposed on the pixel electrode 112. The second substrate 12 includes a second base plate 121 and a common electrode 122. The color filter layer 120 is disposed between the second base plate 121 and the common electrode 122. The first base plate 111 and the second base plate 121 can be glass substrates, plastic sheets or plastic films. The color filter layer 120 can be a red color filter layer, a green color filter layer or a blue color filter. The reflective portion 110 is a reflector for example.

Figure 1B:
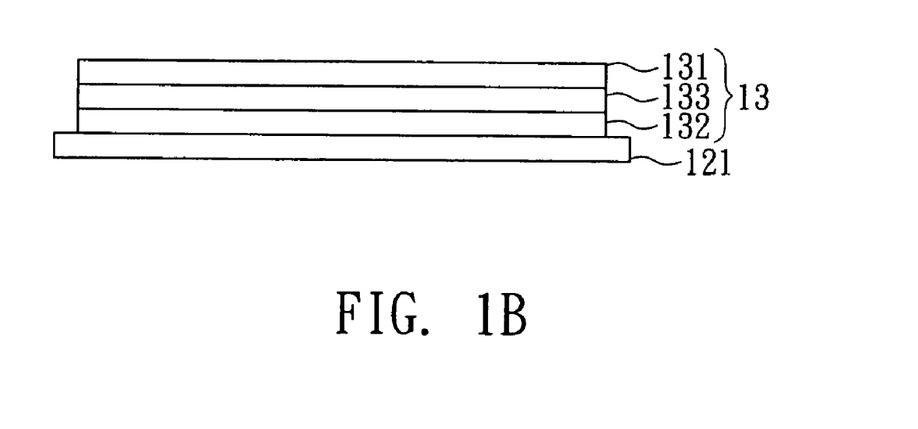
FIG. 1B is a cross-sectional view of an optical filter portion of the LCD panel in FIG. 1A.

As to the structure and the material of the optical filter portion 13 used for color compensation, please refer to FIG. 1B. A cross-section view of the optical filter portion of the LCD panel in FIG. 1A is shown in FIG. 1B. The optical filter portion 13 includes a first metal layer 131, a second metal layer 132 and a spacer layer 133. The spacer layer 133 is disposed between the first metal layer 131 and the second metal layer 132. The first metal layer 131, the second metal layer 132 and the spacer layer 133 can be formed on the second base plate 121 by spin coating in a vacuum coating process. By selecting the thickness and material of the spacer layer 133, light spectrum of different color can be obtained. Please refer to following tables and accompanying drawings for further details.

Figure 2A:
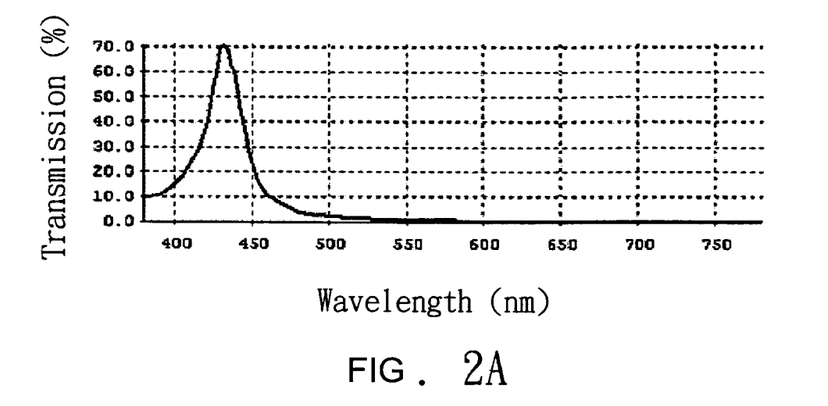
FIGS. 2A~2C show the relation between transmission and spectrum of the optical filter portion in FIG. 1B using the parameters in table 1.
Figure 2B:
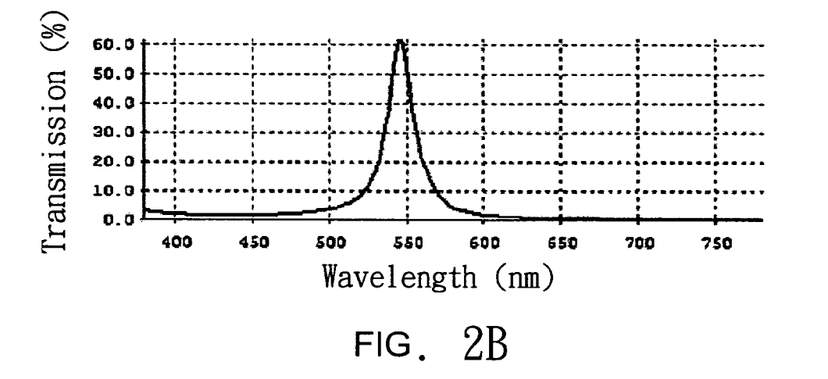
Figure 2C:
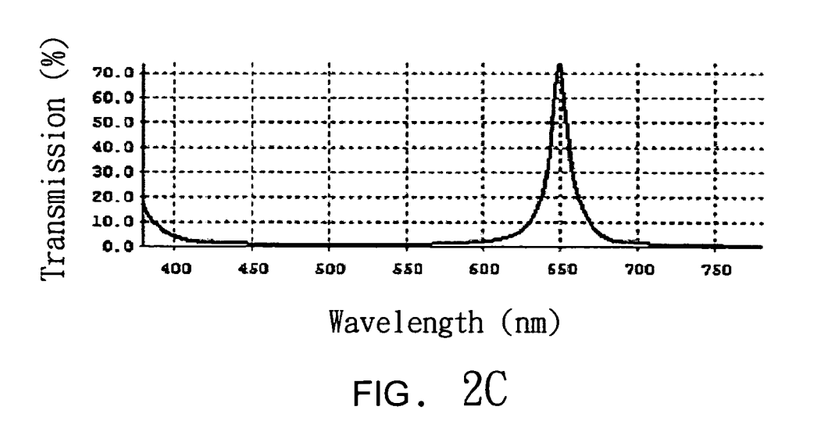

In table 1 and table 2, a light transmission experiment is performed under the conditions that the first metal layer 131 and the second metal layer 132 are made of specific materials and having specific thickness and the spacer layer 133 is made of the same material but has different thickness. FIGS. 2A~2C show the experimental results using the parameters in table 1. The relation between transmission and spectrum of the optical filter portion 13 in FIG. 1B using the parameters in table 1 is shown in the FIGS. 2A~2C.

TABLE 1

| Film structure (figure number) | Material | Thickness (nm) |
|---|---|---|
| First/second metal layer | Silver | 40 |
| Spacer layer (2C) in the red light transmissive region | Titanium dioxide | 92.5 |
| Spacer layer (2B) in the green light transmissive region | Titanium dioxide | 68 |
| Spacer layer (2A) in the blue light transmissive region | Titanium dioxide | 40 |

Generally speaking, the wavelength of the blue light is about 450 nm. The wavelength of the green light is about 546.1 nm. The wavelength of the red light is about 650 nm. The visible light of the wavelength that is between 400 to 450 nm is close to the blue light. Transmission of the visible light of the wavelength within this range is highest when following parameters are used. The first metal layer 131 and the second metal layer 132 are made of silver (Ag). The spacer layer 133 is made of titanium dioxide ($TiO_2$), as shown in FIG. 2A. The thickness of the spacer layer 133 is about 40 nm. In other words, the light displayed by the optical filter portion 13 is blue.

As shown in FIG. 2B, the visible light of the wavelength that is between 500 to 550 nm has highest transmission when the thickness of the spacer layer 133 is about 68 nm. The visible light of the wavelength within this range is close to green light. In other words, the light displayed by the optical filter portion 13 is green.

As shown in FIG. 2C, when the thickness of the spacer layer 133 is about 92.5 nm, the visible light of the wavelength of about 650 nm has highest transmission. The visible light of the wavelength of about 650 nm is close to red light. In other words, the light displayed by the optical filter portion 13 is red.

TABLE 2

Figure 3A:
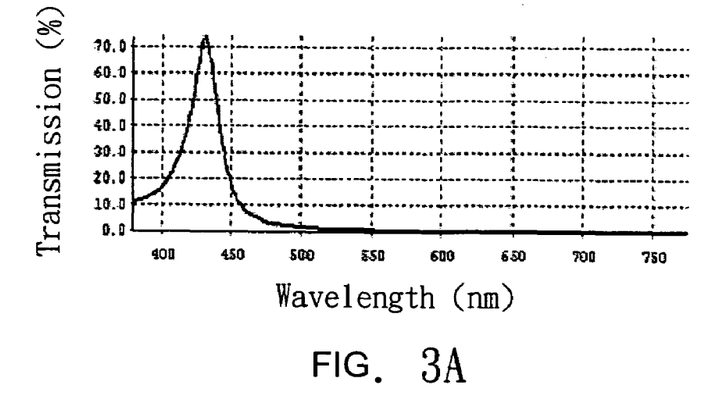
FIGS. 3A~3C show the relation between transmission and spectrum of the optical filter portion in FIG. 1B using the parameters in table 2.
Figure 3B:
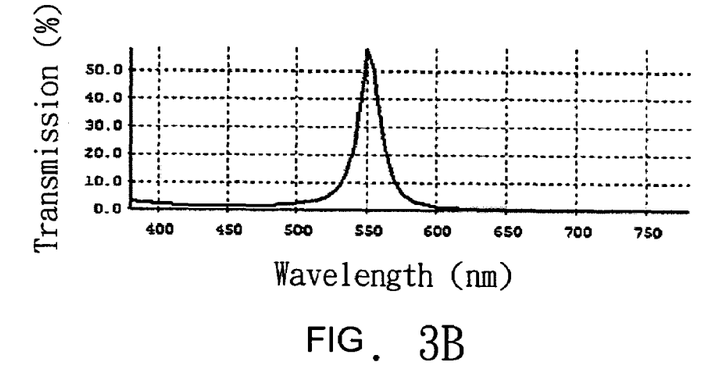
Figure 3C:
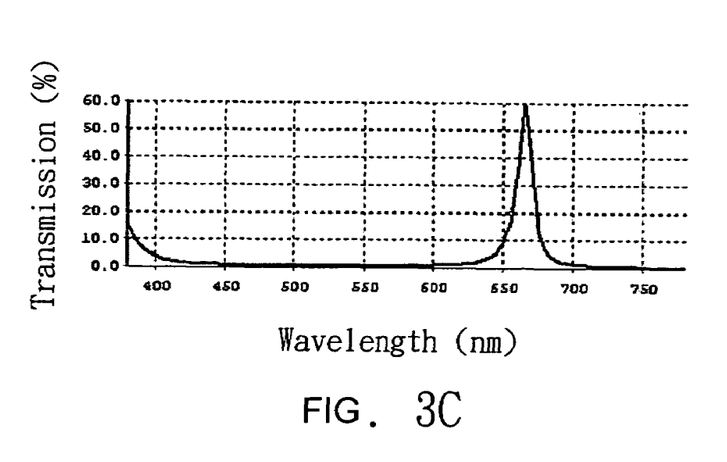

| Film structure (figure number) | Material | Thickness (nm) |
|---|---|---|
| First/second metal layer | Silver | 40 |
| Spacer layer (3C) in the red light transmissive region | Silicon dioxide | 180.5 |
| Spacer layer (3B) in the green light transmissive region | Silicon dioxide | 139 |
| Spacer layer (3A) in the blue light transmissive region | Silicon dioxide | 92 |

Please refer to table 2 and FIGS. 3A~3C. Table 2 shows the parameters of the spacer layer 133 made of silicon dioxide. FIGS. 3A~3C show the relation between transmission and spectrum of the optical filter portion in FIG. 1B using the parameters in table 2. The experimental results are close to those of table 1. As shown in FIG. 3A, when the thickness of the spacer layer 133 is about 92 nm, the visible light of the wavelength that is between 400 to 450 nm has highest transmission (similar to the results in FIG. 2A). The light displayed by the optical filter portion 13 is blue. As shown in FIG. 3B, when the thickness of the spacer layer 133 is about 139 nm, the visible light of the wavelength of about 550 nm has highest transmission (similar to the results in FIG. 2B). The light displayed by the spacer layer 133 is green. As shown in FIG. 3C, when the thickness of the spacer layer 133 is about 180.5 nm, the visible light of the wavelength that is between 650 to 700 nm has highest transmission (similar to the results in FIG. 2C). The light displayed by the spacer layer 133 is red.

Therefore, the transmission spectrum of the light passing through the optical filter portion 13 can be controlled by selecting the films that have specific optical properties for displaying light with different color. The transmission spectrum is adjustable through changing the structure, film thickness and the material of the optical filter portion 13. Preferably, the material of the first metal layer 131 and the second metal layer 132 includes silver. The first metal layer 131 and the second metal layer 132 can also achieve the same results when made of silver alloy. The thickness of the first metal layer 131 and the second metal layer 132 is about 5 to 60 nm. Although the spacer layer 133 is made of silicon dioxide ($SiO_2$) and titanium dioxide ($TiO_2$) in the above experiments, the spacer layer 133 can include a dielectric layer or a conductive metal oxide with the thickness about 10 to 900 nm. When the dielectric layer is used as the spacer layer 133 between the first metal layer 131 and the second metal layer 132, the dielectric layer can be made of magnesium fluoride ($MgF_2$), silicon dioxide ($SiO_2$), aluminum oxide ($Al_2O_3$), titanium dioxide ($TiO_2$), zirconium dioxide ($ZrO_2$) or niobium pentoxide ($Nb_2O_5$). Preferably, the refractive index of the dielectric layer is between 1.3 and 2.6. Furthermore, when the conductive metal oxide is used as the spacer layer 133, the material of the spacer layer 133 preferably includes indium tin oxide (ITO), indium zinc oxide (IZO) or aluminum zinc oxide (AZO).

A multi-color filter device (such as a color filter film) disposed on the second substrate 12 usually includes color filter layer 120 (please referring to FIG. 1A) with different colors, such as a red color filter layer, a green color filter layer or a blue color filter layer. The color filter layer with specific color cooperated with a proper optical filter portion is able to display the specific color in the corresponding pixel element, so as to display multi-color image when the LCD is in the reflection mode. Or, the optical filter portions with the same color are disposed in the color filter layers of all pixel elements for displaying single-color image in the reflection mode.

Figure 4A:
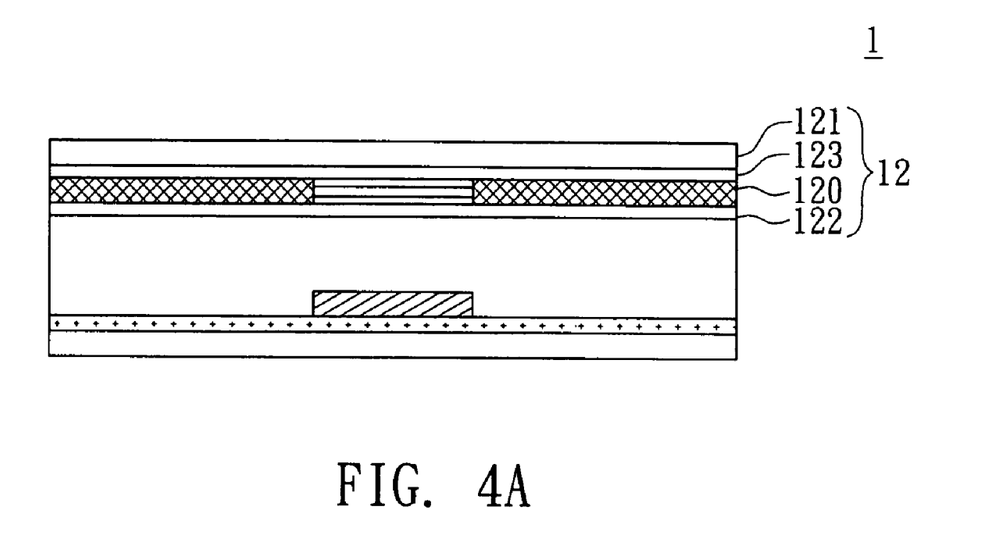
FIGS. 4A~4B are a second and a third cross-sectional views of the LCD panel according to the first embodiment of the present invention.
Figure 4B:
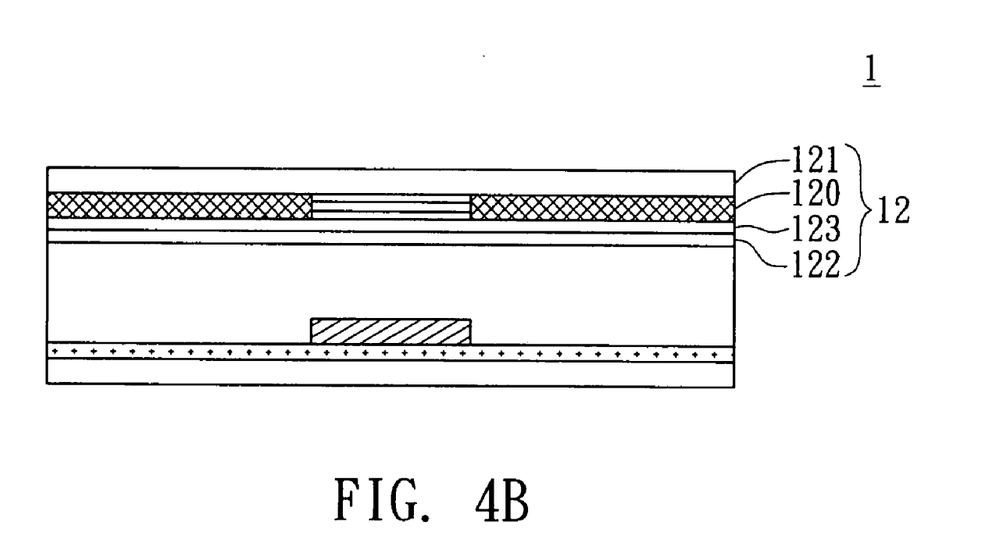

A silicon dioxide layer is preferably formed on the second substrate 12 for isolating or protecting the substrate. Please refer to FIGS. 4A~4B. FIGS. 4A~4B are a second and a third cross-sectional views of the LCD panel according to the first embodiment of the present invention. Preferably, the silicon dioxide layer 123 is disposed between the second base plate 121 and the common electrode 122. The silicon dioxide layer 123 can be disposed between the color filter layer 120 and the second base plate 121, as shown in FIG. 4A. The silicon dioxide layer 123 prevents ions released by the second base plate 121, such as a glass substrate, from permeating into the inner electrode of the second substrate 12. Or, the silicon dioxide layer 123 can be disposed between the color filter layer 120 and the common electrode 122, as shown in FIG. 4B. The silicon dioxide layer 123 can be used for protecting the color filter layer 120 from being scraped.

Figure 5A:
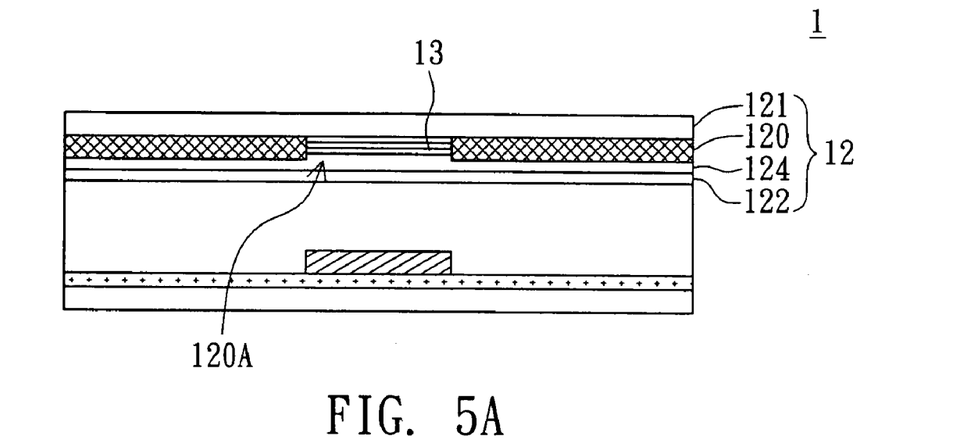
FIGS. 5A~5B are a fourth and a fifth cross-sectional views of the LCD panel according to the first embodiment of the present invention.
Figure 5B:
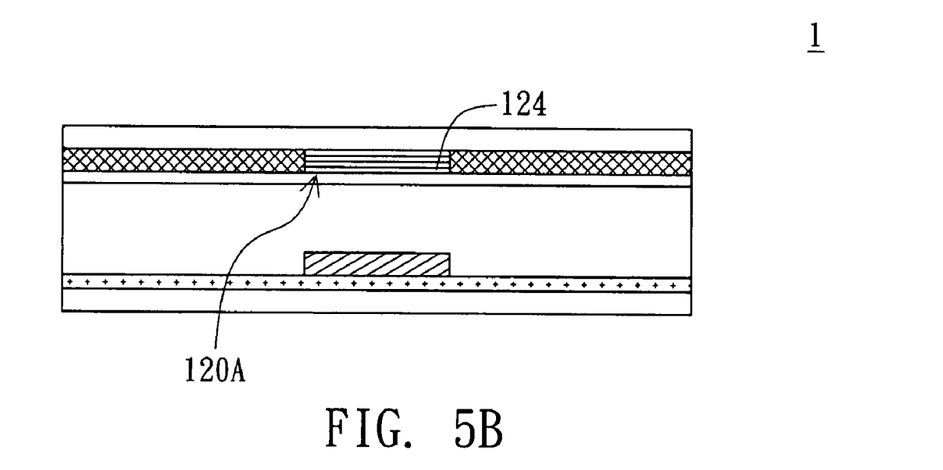

Moreover, a transparent overcoat layer 124 is preferably formed on the second substrate 12 for covering and filling the opening 120A of the color filter layer 120. The overcoat layer 124 is preferably made of silicon dioxide. Please refer to FIGS. 5A~5B. A fourth and a fifth cross-sectional views of the LCD panel according to the first embodiment of the present invention are illustrated in FIGS. 5A~5B. The overcoat layer 124 is disposed between the second base plate 121 and the common electrode 122. As shown in FIG. 5A, the disposition of the overcoat layer 124 can be changed according to disposition of the optical filter portion 13. When the optical filter portion 13 does not fully fill the opening 120A, the overcoat layer 124 preferably covers the entire color filter layer 120 and fully fills the opening 120A for protecting the color filter layer 120 and the optical filter portion 13. Or, as shown in FIG. 5B, the overcoat layer 124 only fills the opening 120A.

The LCD panel has one opening corresponding to one reflective portion (reflection plate) in each pixel element. Due to the coloring effect of the optical filter portion 13, each pixel element of the LCD panel 1 of the present invention displays not only white color but also colors similar to the colors of the pixel structure in the reflective region in the normal mode (when the backlight source is turned on). Besides, the optical filter portion 13 of the present invention has high transmission for red light, green light or blue light. In the reflection mode (when the backlight source is turned off), the LCD panel in the reflective region displays not only black-and-white images but also color images. Furthermore, through the design of the optical filter portion 13 of the present invention, light utilization efficiency and reflectivity in the reflection mode are increased. As a result, red, green or blue color is displayed in high brightness.

Second Embodiment

Figure 6:
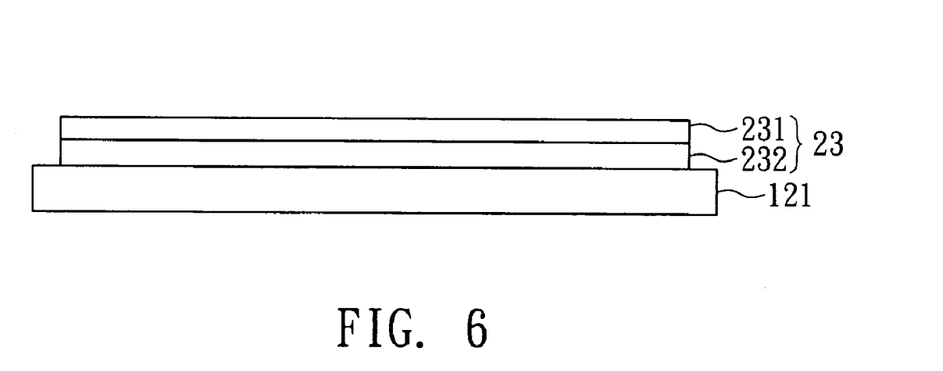
FIG. 6 is a cross-sectional view of the optical filter portion of the LCD panel according to a second embodiment of the present invention.

Please refer to FIG. 6. FIG. 6 is a cross-sectional view of the optical filter portion of the LCD panel according to a second embodiment of the present invention. The difference between the LCD panel of the second embodiment and that of the first embodiment is the design of the optical filter portion. Other components using the same reference numbers are the same and not described repeatedly. As shown in FIG. 6, the optical filter portion 23 includes a conductive metal oxide 231 and a dielectric layer 232 overlapping each other and disposed in the opening 120A (please refer to FIGS. 8A~9B). The conductive metal oxide 231 is made of indium tin oxide (ITO), indium zinc oxide (IZO) or aluminum-doped zinc oxide (AZO). The dielectric layer 232 is made of magnesium fluoride ($MgF_2$), silicon dioxide ($SiO_2$), aluminum oxide ($Al_2O_3$), titanium dioxide ($TiO_2$), zirconium dioxide ($ZrO_2$), or niobium pentoxide ($Nb_2O_5$). Different transmission spectrum can be obtained by selecting the thickness of the films. As s result, the optical filter portion 23 displays different color. Please refer to following tables and accompanying drawings for further details.

Please refer to table 3. The dielectric layer 232 is made of silicon dioxide and has a specific thickness. The conductive metal oxide 231 is made of indium tin oxide with different thickness. The experimental results are shown in FIGS. 7A~7D, the relation between transmission and spectrum of the optical filter portion in FIG. 6 using parameters in table 3 is illustrated.

TABLE 3

| Film structure | Thickness (nm) |
| --- | --- |
| (I) Silicon dioxide/indium tin oxide | 25/100 |
| (II) Silicon dioxide/indium tin oxide | 25/200 |
| (III) Silicon dioxide/indium tin oxide | 25/300 |
| (IV) Silicon dioxide/indium tin oxide | 25/500 |

Figure 7A:
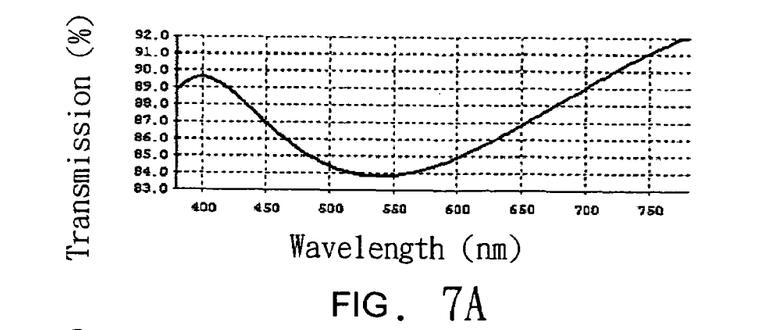
FIGS. 7A~7D show the relation between transmission and spectrum of the optical filter portion in FIG. 6 using parameters in table 3.
Figure 7B:
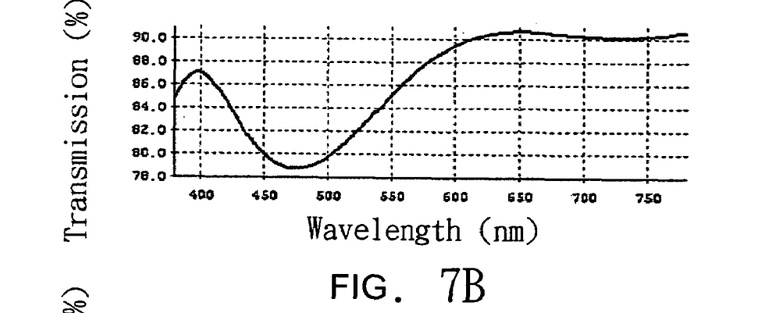
Figure 7C:
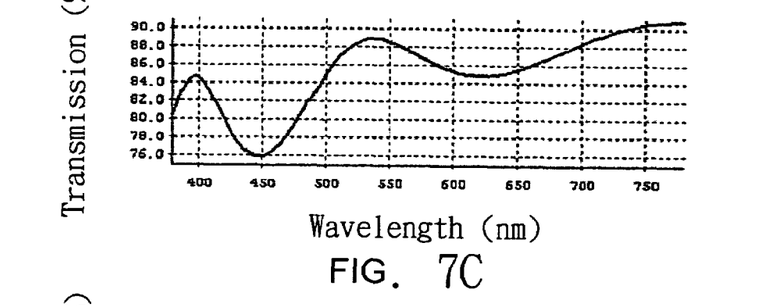
Figure 7D:
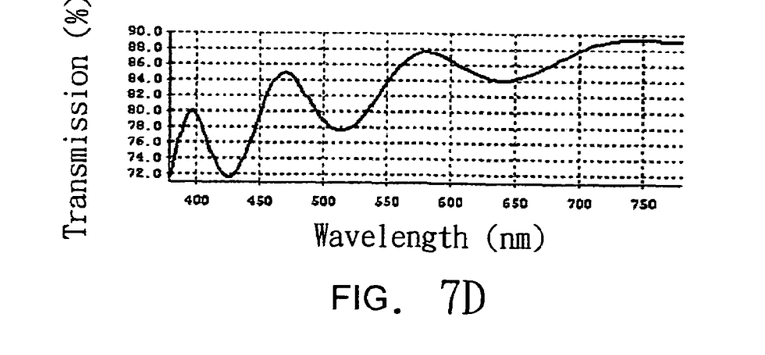

The thickness of the dielectric layer 232 (silicon dioxide) is 25 nm. As shown in FIGS. 7A~7D, when the thickness of the conductive metal oxide 231 (indium tin oxide) is different, the optical filter portion 23 filters the visible light within a specific range. FIG. 7A shows the results using the parameters in the column I of table 3. FIG. 7B shows the results using the parameters in the column II of table 3. FIG. 7C shows the results using the parameters in the column III of table 3. FIG. 7D shows the results using the parameters in the column IV of table 3. The optical filter portion 23 has different transmission corresponding to different wavelengths. Therefore, when yellow shift (longer wavelength) occurs in the LCD panel in the reflection mode, the optical filter portion 23 that allows a visible light of short wavelength to have higher transmission (such as the corresponding design in FIG. 7A) can be used for white compensation. When blue shift (shorter wavelength) occurs in the LCD panel in the reflection mode, the optical filter portion 23 that allows a visible light of long wavelength to have high transmission (such as the corresponding design in FIG. 7C) can be used for white compensation.

Figure 8A:
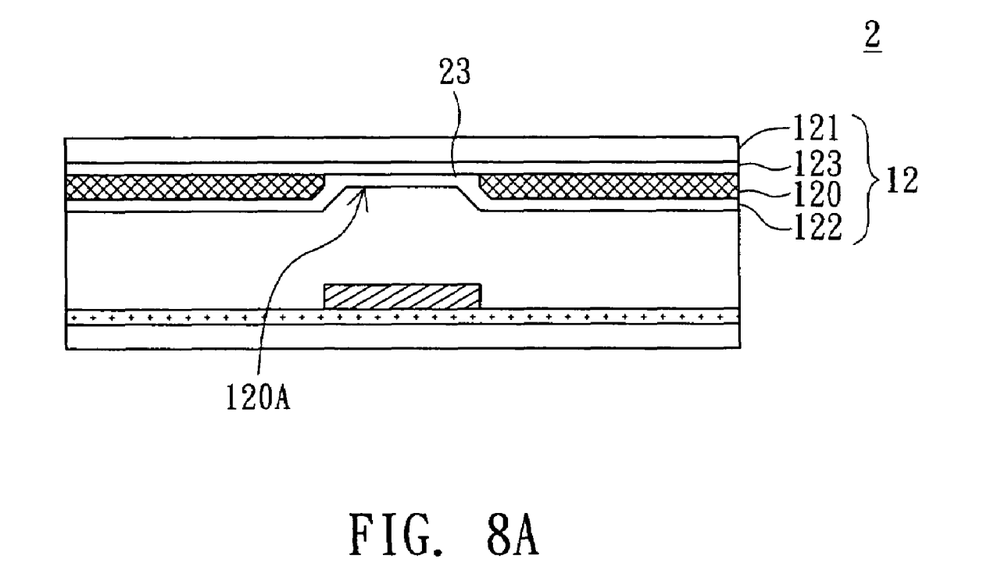
FIGS. 8A~8B are a first and a second cross-sectional views of the LCD panel according to the second embodiment of the present invention.
Figure 8B:
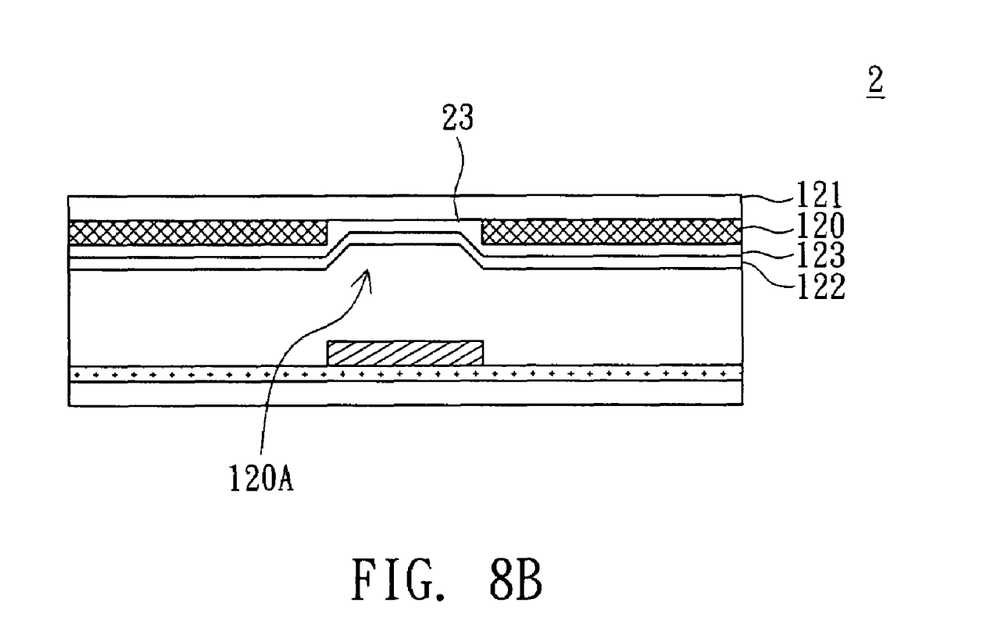

Please refer to FIGS. 8A~8B, a first and a second cross-sectional views of the LCD panel according to the second embodiment of the present invention are shown in FIGS. 8A~8B. One pixel structure of the LCD panel 2 is shown in FIGS. 8A~8B. As shown in FIGS. 8A~8B, the silicon dioxide layer 123 is formed on the second substrate 12 of the LCD panel 2, and the common electrode 122 (often made of ITO) is formed on the second base plate 121. As a result, the above-described optical filter portion 23 is formed in the opening 120A. As shown in FIG. 8A, when the silicon dioxide layer 123 is disposed between the color filter layer 120 and the second base plate 121, the silicon dioxide layer 123 not only separates the second base plate 121 from the color filter layer 120 but also filters light in the opening 120A. As shown in FIG. 8B, when the silicon dioxide layer 123 is disposed between the color filter layer 120 and the common electrode 122, the silicon dioxide layer 123 protects the color filter layer 120 from being scraped.

Figure 9A:
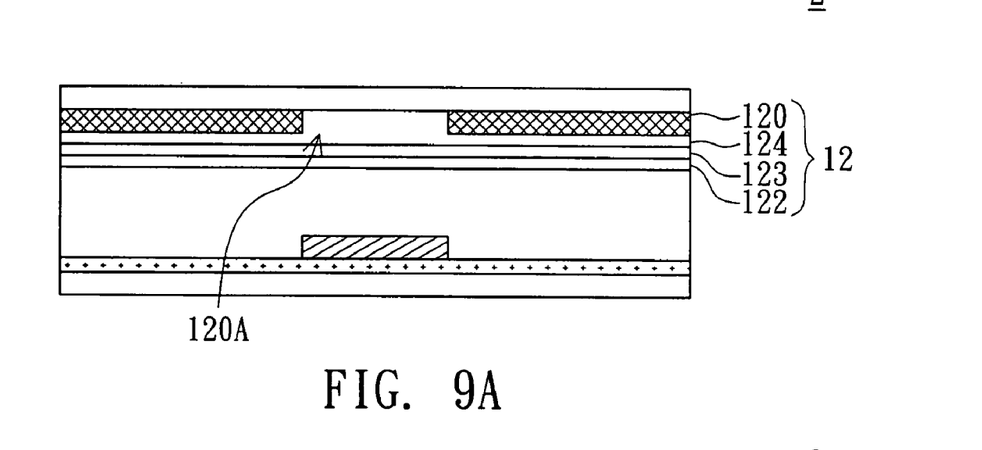
FIGS. 9A~9B are a third and a fourth cross-sectional views of the LCD panel according to the second embodiment of the present invention.
Figure 9B:
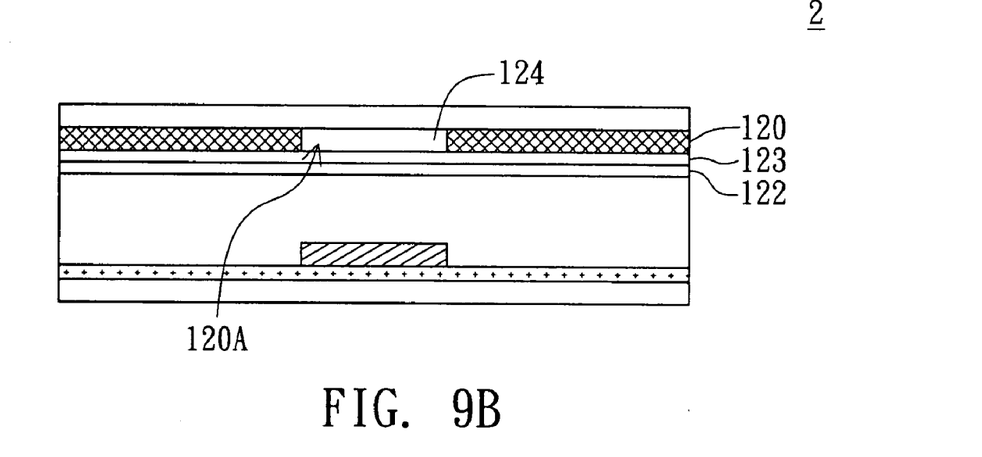

In FIGS. 8A~8B, the opening 120A is not fully filled. However, the opening 120A can be fully filled, and then the common electrode 122 is formed on the second base plate 121. Please refer to FIGS. 9A~9B. FIGS. 9A~9B are a third and a fourth cross-sectional views of the LCD panel according to the second embodiment of the present invention. The overcoat layer 124 preferably covers the entire opening 120A of the second substrate 12. For example, as shown in FIG. 9A, the overcoat layer 124 covers the color filter layer 120 and the opening 120A. Then, the silicon dioxide layer 123 and the common electrode 122 are formed. Or, as shown in FIG. 9B, the overcoat layer 124 only filled the opening 120A. Then, the silicon dioxide layer 123 and the common electrode 122 are formed.

Although the optical filter portion 23 of the second embodiment has no coloring effect, white compensation is made in the reflection mode.

Third Embodiment

Figure 10:
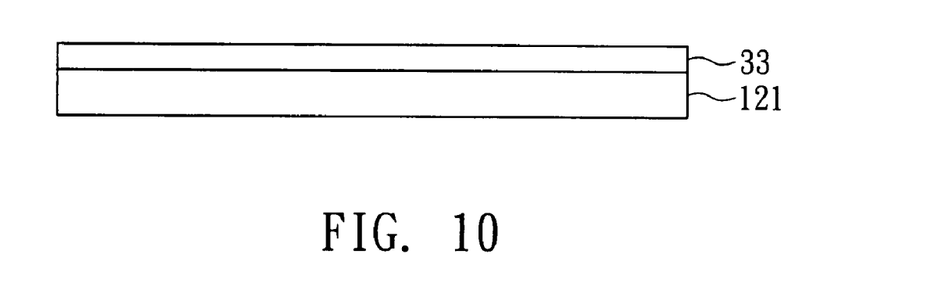
FIG. 10 is a cross-sectional view of the optical filter portion of the LCD panel according to a third embodiment of the present invention.

FIG. 10 is a cross-sectional view of the optical filter portion of the LCD panel according to a third embodiment of the present invention. Please refer to FIG. 10. The difference between the LCD panel of the third embodiment and that of the first embodiment is the design of the optical filter portion 33. Other parts using the same reference numbers are the same and not described repeatedly. As shown in FIG. 10, the optical portion 33 can only include a conductive metal oxide disposed in the opening 120A (please referring to FIGS. 12A~12C). The conductive metal oxide is preferably made of ITO, IZO or AZO. Depending on the optical filter portion 33 with different thickness, different transmission spectrum can be obtained. Please refer to table 4. The optical filter portions 33 made of ITO having different thickness are used in the experiments.

TABLE 4

| Film structure | Thickness (nm) |
| --- | --- |
| (I) Indium tin oxide | 100 |
| (II) Indium tin oxide | 200 |
| (III) Indium tin oxide | 300 |
| (IV) Indium tin oxide | 500 |

Figure 11A:
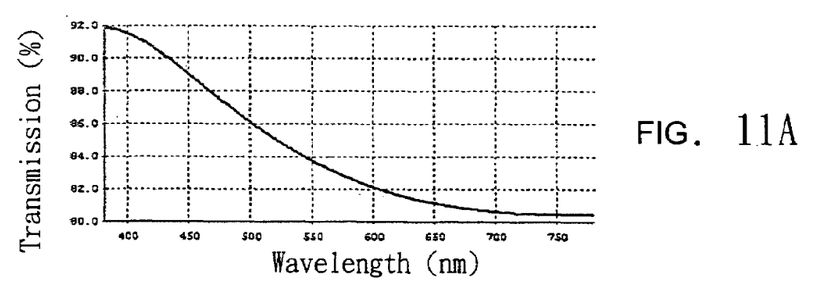
FIGS. 11A~11D show the relation between transmission and spectrum of the optical filter portion in FIG. 10 using the parameters in table 4.
Figure 11B:
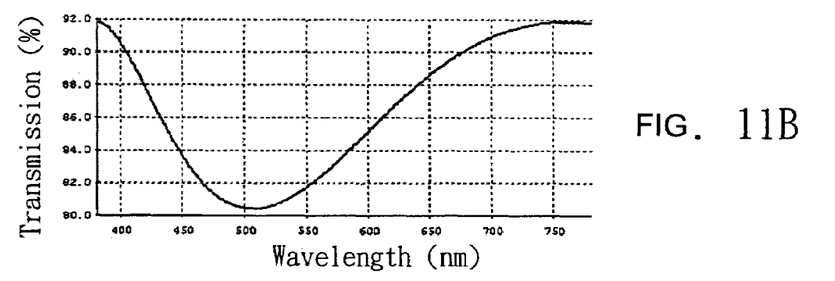
Figure 11C:
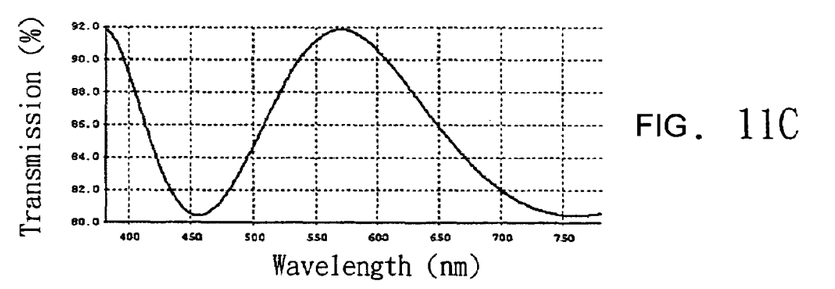
Figure 11D:
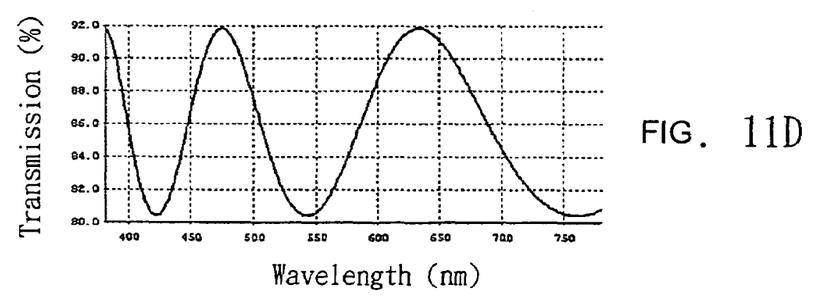

The experimental results using the parameters in table 4 are illustrated in FIGS. 11A~11D, which show the relation between transmission and spectrum of the optical filter portion in FIG. 10. FIG. 11A shows the results using the parameters in the column I of table 4. FIG. 11B shows the results using the parameters in the column II of table 4. FIG. 11C shows the results using the parameters in the column III of table 4. FIG. 11D shows the results using the parameters in the column IV of table 4. As shown in FIGS. 11A~11D, when the conductive metal oxide of the optical filter portion 33 has different thickness, transmission for the visible light of different wavelengths is different. According to this property, when yellow shift (longer wavelength) occurs in the LCD panel in reflection mode, the optical filter portion 33 that allows a visible light of short wavelength to have high transmission (such as the corresponding design in FIG. 11A) can be selected for achieving white compensation. When blue shift (shorter wavelength) occurs in the LCD panel in the reflection mode, the optical filter portion 33 that allows a visible light of long wavelength to have high transmission (such as the corresponding design in FIG. 11C) can be selected for achieving white compensation.

Figure 12A:
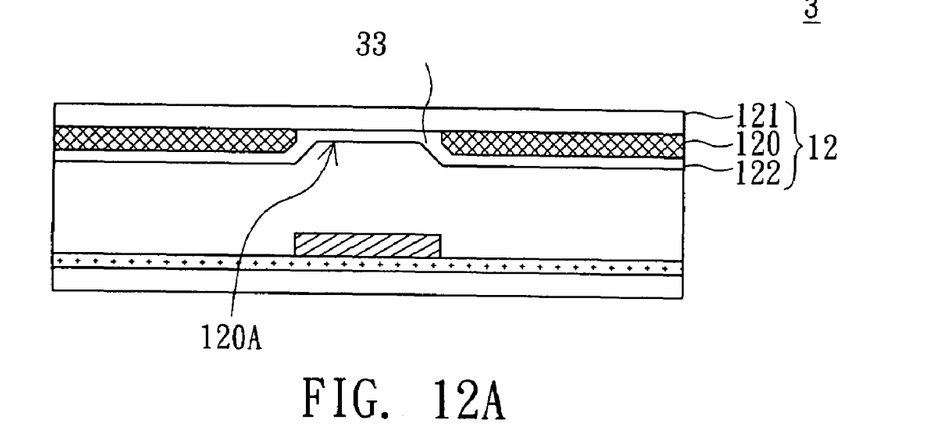
FIGS. 12A~12C are a first, a second and a third cross-sectional views of the LCD panel according to the third embodiment of the present invention.
Figure 12B:
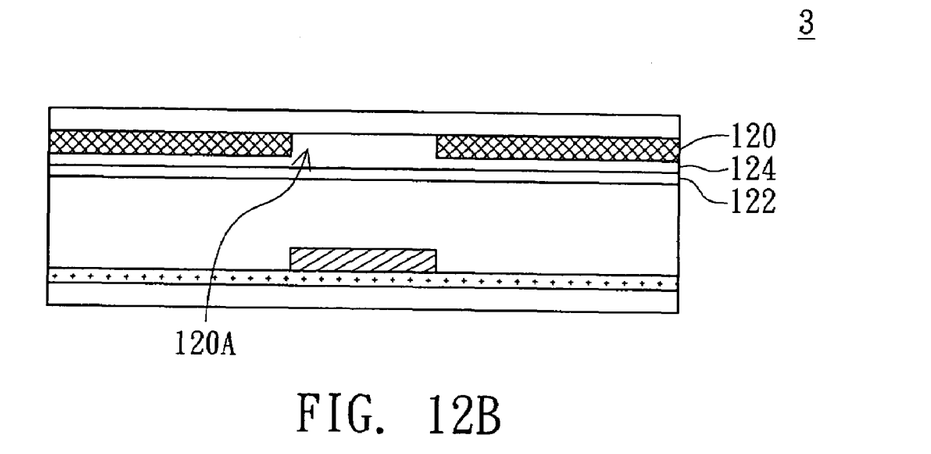
Figure 12C:
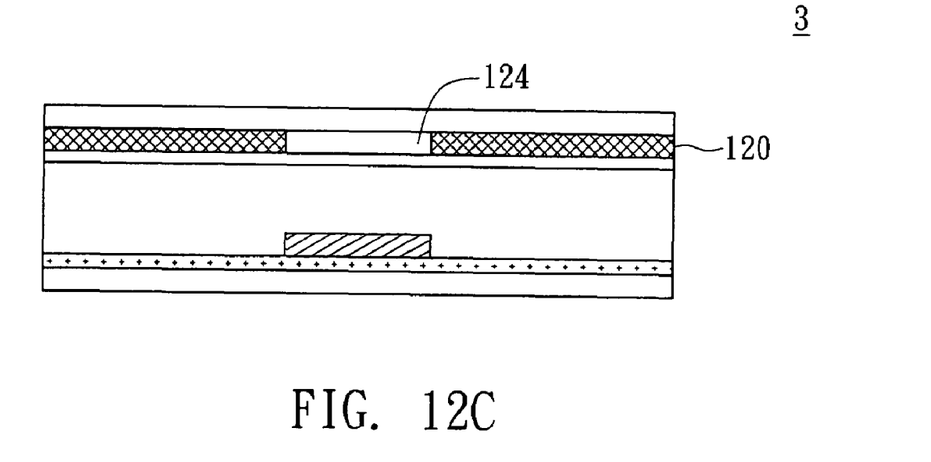

Please referring to FIGS. 12A~12C, a first, a second and a third cross-sectional views of the LCD panel according to the third embodiment of the present invention are illustrated respectively. One pixel structure of the LCD panel is shown in FIGS. 12A~12C. As shown in FIG. 12A, the common electrode 122 (usually made of ITO) is formed on the color filter layer 120 and the opening 120A thereof. The ITO in the opening 120A can be used as the optical filter portion 33. Furthermore, the overcoat layer preferably covers the opening 120A first, and then the common electrode 122 is formed.

As shown in FIG. 12B, the overcoat layer 124 preferably covers the entire color filter layer 120 and the opening 120A. Or, as shown in FIG. 12C, the overcoat layer 124 can only fill the opening 120A.

Fourth Embodiment

Figure 13:
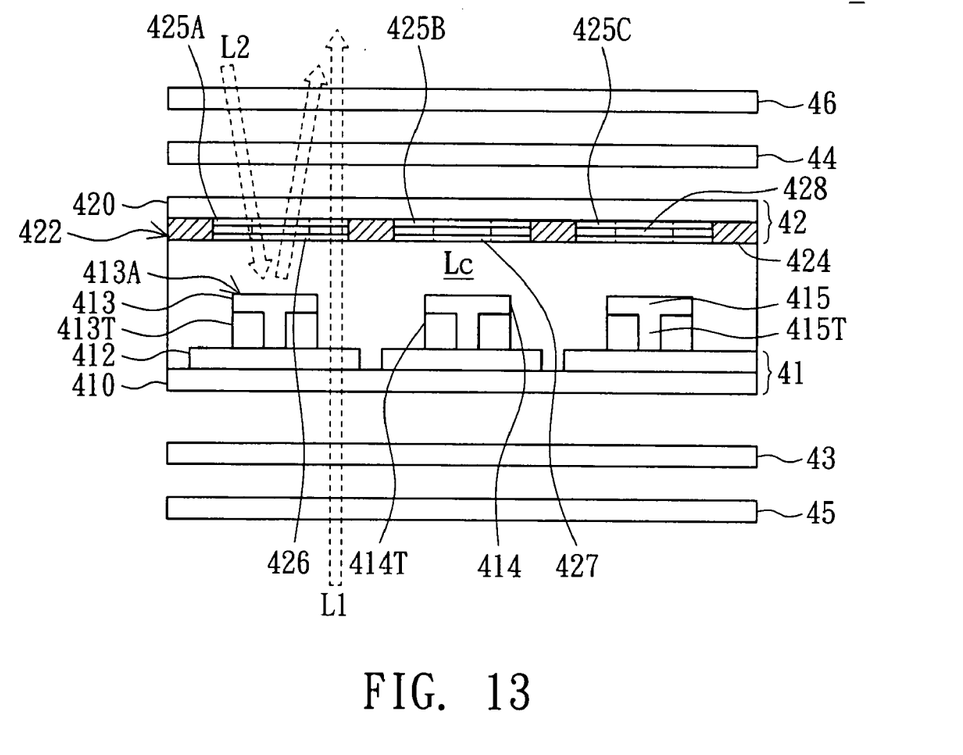
FIG. 13 is a cross-sectional view of the LCD panel according to a fourth embodiment of the present invention.

Please refer to FIG. 13. FIG. 13 is a cross-sectional view of the LCD panel according to a fourth embodiment of the present invention. As shown in FIG. 13, the LCD panel 4 includes a first substrate 41, a second substrate 42, a first quarter-wave plate 43, a second quarter-wave plate 44, a first polarizer 45 and a second polarizer 46. The first substrate 41 is parallel to the second substrate 42. A liquid crystal layer Lc is sealed between the first substrate 41 and the second substrate 42. The first quarter-wave plate 43 is disposed on the side of the first substrate 41. The second quarter-wave plate 44 is disposed on the side of the second substrate 42. The first polarizer 45 is disposed under the first quarter-wave plate 43. The second polarizer 46 is disposed on the side of the second quarter-wave plate 44. The first substrate 41 includes a first base plate 410, a pixel electrode 412 and a plurality of reflective portions. The second substrate 42 includes a second base plate 420 and a color filter structure 422. The color filter structure 422 includes a black matrix layer 424, a plurality of color filter layers and a plurality of optical filter portions. The black matrix layer is for separating each color filter layer. Each color filter layer has an opening for disposing the optical filter portion. One optical filter portion is corresponding to one reflective portion. As a result, each pixel element is able to display colors both in the reflection mode and the transmission mode.

Three pixel elements displaying three different colors are illustrated in the present embodiment as an example. The color filter structure 422 includes three color filter layers 425A, 425B and 425C and three optical filter portions 426, 427 and 428. The optical filter portions are the same as the optical filter portion 13 in the first embodiment and include the first metal layer, the second metal layer and the spacer layer respectively. The visible light having a wavelength within a specific range can pass through the optical filer portion by selecting the material and the thickness of the films. Accordingly, a plurality of colors can be displayed. For example, red light, green light and blue light pass through the optical filter portions 426, 427 and 428 corresponding to the reflective portions 413, 414 and 415 respectively. The color filter layers 425A, 425B and 425C are three-layer structures as well. Each one of the color filter layers 425A, 425B and 425C includes a third metal layer, a fourth metal layer and another spacer layer. The third metal layer of each color filter layer connects with the first metal layer of the optical filter layer. The fourth metal layer of each color filter layer connects with the second metal layer of the optical filter layer. The spacer layer of the color filter layer connects with the spacer layer of the optical filter layer. Preferably, the third metal layer is made of the same material as the first metal layer. The fourth metal layer is made of the same material as the second metal layer. The spacer layer of the color filter layer is made of the same material as the spacer layer of the optical filter layer.

The LCD panel 4 is a multi-domain vertical alignment LCD panel for example. The first quarter-wave plate 43 is preferably a −45° quarter-wave plate. The second quarter-wave plate 44 is preferably a +45° quarter-wave plate. The first polarizer 45 is preferably a y-axis linear polarizer. The second polarizer 46 is preferably an x-axis linear polarizer.

Moreover, each one of the reflective portions 413, 414 and 415 includes a filling layer (marked as 413T, 414T and 415T) for changing the height and position of the reflective portions. Accordingly, the optical path difference of the reflected light L2 in the liquid crystal layer Lc is changed. Take the reflective portion 413 for example. The height of the reflective surface 413A in the liquid crystal layer Lc is equal to a half of the thickness of the liquid crystal layer Lc, for forming a dual-gap optical structure. Furthermore, when driven, the liquid crystal molecules in the reflective region corresponding to the reflective portion have phase difference equal to a quarter of the wavelength. When driven, the liquid crystal molecules in the transmissive region have phase difference equal to a half of the wavelength.

When the liquid crystal molecules are not driven, the light L2 from the surroundings passes through second quarter-wave plate 44 from the second polarizer 46 and then becomes right circularly polarized light. After passing through the optical filter portion 413 and then entering the liquid crystal layer Lc, the red right circularly polarized light enters the first quarter-wave plate 43 and then becomes x-axis polarized light. Afterwards, the red right circularly polarized light enters the first polarizer 45 (y-axis linear polarizer) and forms the dark state. Furthermore, a portion of the red right circularly polarized light is reflected by the reflective portion 413 and then becomes left circularly polarized light. After passing through the second quarter-wave plate 44 and becoming y-axis polarized, the left circularly polarized light enters the second polarizer 46 (x-axis linear polarizer) and forms dark state. The green and blue right circularly polarized light reflected by the optical filter portion 413 enters the second quarter-wave plate 44 and becomes y-axis polarized. Afterward, the green and blue right circularly polarized light enters the second polarizer 46 (x-axis linear polarizer) and forms the dark state. Therefore, the green light and blue light reflected by the optical filter portion 413 are blocked for achieving good contrast. As a result, the second quarter-wave plate 44 and the second polarizer 46 disposed on the side of the second substrate 42 lower the reflection effect on the second substrate 42 caused by the surrounding light.

When the liquid crystal molecules are not driven, the light L1 emitted by the backlight source passes through the first polarizer (y-axis linear polarizer) and enters the first quarter-wave plate 43. Then, the light L1 becomes right circularly polarized light. After passing through the second quarter-wave plate 44, the light L1 becomes y-axis polarized light. Subsequently, the light L1 and the second polarizer 46 (x-axis linear polarizer) are orthogonal and form the dark state.

When the liquid crystal molecules are driven, the light L1 passes through the first polarizer 45 (y-axis linear polarizer). After entering the first quarter-wave plate 43, the light L1 becomes right circularly polarized. Then, the light L1 passes through the liquid crystal layer Lc with the phase difference equal to a half of the wavelength and becomes left circularly polarized. Afterward, the light L1 enters the second quarter-wave plate 44 and becomes x-axis polarized. Therefore, the light L1 is able to pass through the second polarizer 46 (x-axis linear polarizer) for forming the bright state. When the LCD panel is in the reflection mode, the bright state can also be formed accordingly.

In the dual-gap optical structure, the upper optical system on the side of the second substrate using the surrounding light is a circularly polarized system for eliminating the reflection effect of the surrounding light due to the optical filter portion. Although the MVA LCD panel is illustrated in the present embodiment as an example, other types of single-cell LCD panels, such as a mixed-mode twisted Nematic (MTN) LCD, an electrically controlled birefringence (ECB) LCD or a vertical alignment (VA) can use a circularly polarized mode as the upper optical system for eliminating the reflection effect of the surrounding light due to the optical filter portion.

Fifth Embodiment

Figure 14:
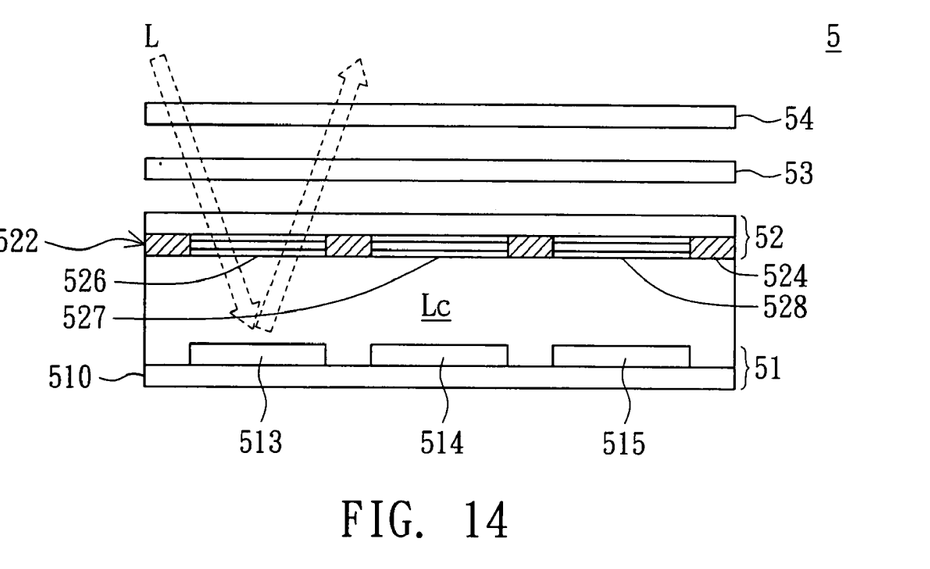
FIG. 14 is a cross-sectional view of a reflective LCD panel.

FIG. 14 is a cross-sectional view of a reflective LCD panel. As shown in FIG. 14, the LCD panel 5 includes a first substrate 51, a second substrate 52, a quarter-wave plate 53 and a polarizer 54. The first substrate 51 is parallel to the second substrate 52. The liquid crystal layer Lc is disposed between the first substrate 51 and the second substrate 52. The quarter-wave plate 53 is disposed on the side of the second substrate 52. The polarizer 54 is disposed on the quarter-wave plate 53. The first substrate 51 includes a first base plate 510 and reflective portions 513, 514 and 515. The reflective portions 513, 514 and 515 are disposed on the first base plate 510 for reflecting light from the surroundings. The second substrate 51 includes a second base plate 520 and a color filter structure 522. The color filter structure 522 includes a black matrix layer 524 and three optical filter portions 526, 527 and 528. The black matrix layer 524 is for separating each optical filter portion. The optical filter portions 525, 527 and 528 are the same as the optical filter portion 13 in the first embodiment. The visible light having a wavelength within a specific range can pass through the optical filer portion by selecting the material and the thickness of the films. Accordingly, a plurality of colors can be displayed. For example, red light, green light and blue light pass through the optical filter portions 526, 527 and 528 corresponding to the pixel elements displaying red, green and blue respectively. The polarizer 54 is preferably an x-axis linear polarizer. The quarter-wave plate 53 is preferably a +45° quarter-wave plate.

Take the pixel element displaying red color for example. The red light in the light L from the surroundings passes through the optical filter portion 526. The green and blue right circularly polarized light reflected by the optical filter portion 526 enters the quarter-wave plate 53 and becomes y-axis polarized light. Then, the green light and blue light propagate to the polarizer 53 (x-axis linear polarizer) and form the dark state. Therefore, green light and blue light reflected by the optical filter portion 526 are blocked. As a result, the quarter-wave plate 53 and the polarizer 54 disposed on the side of the second substrate 52 eliminate reflection effect of the surrounding light on the second substrate 52. The LCD panel 5 has better contrast when displaying images.

Sixth Embodiment

Figure 15:
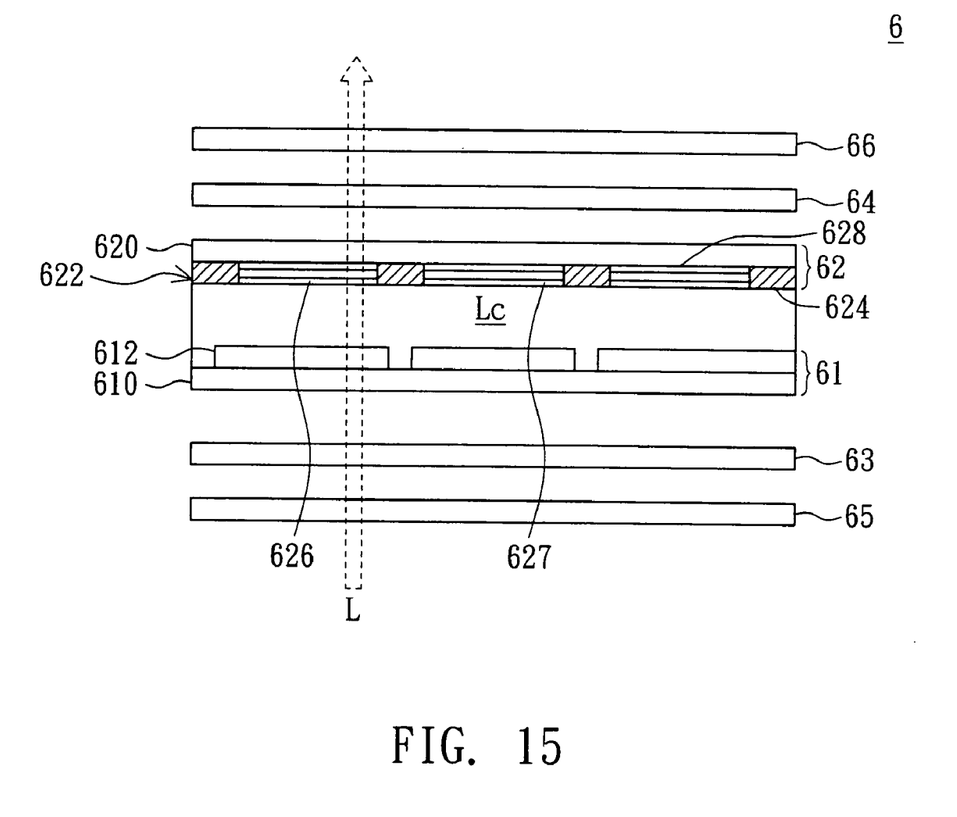
FIG. 15 is a cross-sectional view of a transmissive LCD.

FIG. 15 is a cross-sectional view of a transmissive LCD. As shown in FIG. 15, the LCD panel 6 includes a first substrate 61, a second substrate 62, a first quarter-wave plate 63, a second quarter-wave plate 64, a first polarizer 65 and a second polarizer 66. The first substrate 61 is parallel to the second substrate 62. The liquid crystal layer Lc is disposed between the first substrate 61 and the second substrate 62. The first quarter-wave plate 64 is disposed on the side of the second substrate 62. The first polarizer 65 is disposed on the first quarter-wave plate 63. The second polarizer 66 is disposed on the side of the second quarter-wave plate 64. The first substrate 61 includes a first base plate 610 and a plurality of pixel electrodes 612. The second substrate 62 includes a second base plate 620 and a color filter structure 622. The color filter structure 622 includes a black matrix layer 624 and three optical filter portions 626, 627 and 628. The black matrix layer 624 is for separating each optical filter portion. The optical filter portions 626, 627 and 628 are the same as the optical filter portion 13 in the first embodiment. The visible light having the wavelength within a specific range can pass through the optical filter portion by selecting the material and the thickness of the films. Accordingly, a plurality of colors can be displayed. For example, red light, green light and blue light pass through the optical filter portions 626, 627 and 628 corresponding to the pixel elements displaying red, green and blue color respectively.

The LCD panel 6 is a MVA LCD panel for example. The first quarter-plate 63 is preferably a −45° quarter-wave plate. The second quarter-plate 64 is preferably a +45° quarter-wave plate. The first polarizer 65 is preferably a y-axis linear polarizer. The second polarizer 66 is preferably an x-axis linear polarizer.

When the liquid crystal molecules are driven, the light L passes through the first polarizer 65 (y-axis linear polarizer) first. Then, the light L passes through the first quarter-wave plate 63 and becomes right circularly polarized light. After passing through the liquid crystal layer Lc having the phase difference equal to a half of the wavelength, the light L becomes left circularly polarized light. Subsequently, the light L passes through the second quarter-wave plate 64 and becomes x-axis polarized light. Therefore, the light L is able to pass through the second polarizer 66 (x-axis linear polarizer) and forms the bright state.

The LCD panels revealed in the first, second, third and fourth embodiments, the reflective LCD panel revealed in the fifth embodiment and the transmissive LCD panel revealed in the sixth embodiment can be applied to any electronic device with a display panel. In the electronic device, the display panel usually includes a light source module disposed on one side of the display panel for providing the display panel with the backlight. For example, the electronic device is a screen of a desktop computer or a laptop computer, a liquid crystal television or a screen of a mobile communication device, such as a mobile phone, a personal digital assistant (PDA). Besides, the present invention can be applied to a display screen of a general electronic apparatus.

In the LCD panels and the electronic devices using the same revealed in the above embodiments of the present invention, the color filter layer with the opening is disposed on the substrate of the LCD panel. Also, the optical filter portion is disposed in the opening. Therefore, coloring effect or color compensation can be achieved when the LCD is in the reflection mode. By selecting the material and the thickness of the films of the optical filter portion, the visible light of different wavelength has different transmission. Therefore, the color of the visible light can be controlled. Accordingly, when in the reflection mode, the LCD panel is still able to display color images. Furthermore, the optical filter portion has high transmission. Therefore, by adjusting the thickness and the material of the optical filter portion, the light utilization efficiency of the LCD panel is increased for improving the display quality.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal display (LCD) panel comprising a plurality of pixel elements, each pixel element comprising:
   a first substrate comprising a reflective portion;
      a second substrate parallel to the first substrate and comprising a color filer layer disposed between the first substrate and the second substrate, the color filter layer comprising an opening opposite to the reflective portion, a liquid crystal layer disposed between the first substrate and the second substrate; and
      an optical filter portion disposed in the opening of the color filter layer for providing color compensation in the reflection mode.

2. The LCD panel according to claim 1, wherein the colors displayed by the pixel elements after color compensation at least comprise one of white, red, green and blue.

3. The LCD panel according to claim 1, wherein the first substrate further comprises a first base plate and a pixel electrode, the reflective portion is disposed on the electrode, the second substrate further comprises a second base plate and a common electrode, the color filter layer is disposed between the second base plate and the common electrode.

4. The LCD panel according to claim 3, wherein the optical filter portion comprises a metal conductive oxide.

5. The LCD panel according to claim 4, wherein the material of the metal conductive oxide comprises indium tin oxide (ITO), indium zinc oxide (IZO) or aluminum zinc oxide (AZO).

6. The LCD panel according to claim 4, wherein the optical filter portion further comprises a dielectric layer disposed in the opening and overlapping the metal conductive oxide.

7. The LCD panel according to claim 6, wherein the material of the dielectric layer comprises magnesium fluoride ($MgF_2$), silicon dioxide ($SiO_2$), aluminum oxide ($Al_2O_3$), titanium dioxide ($TiO_2$), zirconium dioxide ($ZrO_2$) or niobium pentoxide ($Nb_2O_5$).

8. The LCD panel according to claim 6, wherein the refractive index of the dielectric layer is substantially between 1.3 and 2.6.

9. The LCD panel according to claim 3, wherein the second substrate further comprises an overcoat layer disposed between the second base plate and the common electrode, and the overcoat layer is covered on the opening.

10. The LCD panel according to claim 3, wherein the second substrate further comprises a silicon dioxide disposed between the second base plate and the common electrode.

11. The LCD panel according to claim 10, wherein the silicon dioxide layer is disposed between the color filter layer and the common electrode.

12. The LCD panel according to claim 10, wherein the silicon dioxide layer is disposed between the color filter layer and the second base plate.

13. The LCD panel according to claim 3, wherein the first base plate and the second base plate are glass substrates, plastic sheets or plastic films.

14. The LCD panel according to claim 1, wherein the reflective portion comprises a reflector.

15. An electronic device comprising:
   a display panel comprising a plurality of pixel elements, each pixel element comprising:
      a first substrate comprising a reflective portion;
      a second substrate parallel to the first substrate and comprising a color filter layer disposed between the first substrate and the second substrate, the color filter layer comprising an opening opposite to the reflective portion, a liquid crystal layer disposed between the first substrate and the second substrate; and
      an optical filter portion disposed in the opening of the color filter layer for providing color compensation in a reflection mode; and
   a light source module disposed on one side of the display panel for providing the display panel with a light source.

16. The electronic device according to claim 15, wherein the first substrate further comprises a first base plate and a pixel electrode, the reflective portion disposed on the pixel electrode, the second substrate further comprises a second base plate and a common electrode, the color filter layer is disposed between the second base plate and the common electrode.

17. The electronic device according to claim 16, wherein the optical filter portion comprises a metal conductive oxide.

18. The electronic device according to claim 17, wherein the material of the metal conductive oxide comprises indium tin oxide (ITO), indium zinc oxide (IZO) or aluminum zinc oxide (AZO).

19. The electronic device according to claim 17, wherein the optical filter portion further comprises a dielectric layer disposed in the opening and overlapping the metal conductive oxide.

20. The electronic device according to claim 16, wherein the optical filter portion comprises:
   a first metal layer and a second metal layer; and
   a first spacer layer disposed between the first metal layer and the second metal layer.

21. The electronic device according to claim 20, wherein the material of the first metal layer and the second metal layer comprises silver or silver alloy.

22. The electronic device according to claim 20, wherein the thickness of the first metal layer and the second metal layer is substantially between 5 to 60 nm, the thickness of the first spacer layer is substantially between 10 to 900 nm.

23. The electronic device according to claim 20, wherein the first spacer layer comprises a dielectric layer or a metal conductive oxide.

24. The electronic device according to claim 20, wherein the color filter layer comprises:
   a third metal layer and a fourth metal layer, the third metal layer connecting with the first metal layer, the fourth metal layer connecting with the second metal layer; and
   a second spacer layer disposed between the third metal layer and the fourth metal layer, the second spacer layer connecting with the first spacer layer.

25. The electronic device according to claim 24, wherein the display panel further comprises a first quarter-wave plate, a second quarter-wave plate, a first polarizer and a second polarizer, the first quarter-wave plate disposed on the side of the first substrate, the second quarter-wave plate disposed on the side of the second substrate, the first polarizer disposed on the side of the first quarter-wave plate, the second polarizer disposed o the side of the second quarter-wave plate.

* * * * *